United States Patent [19]

Sin

[11] Patent Number: 5,225,906
[45] Date of Patent: Jul. 6, 1993

[54] CIRCUIT FOR IMAGE SIGNAL TRANSMISSION AND RECEPTION BY ADAPTIVE MODULATION AND A METHOD THEREFOR

[75] Inventor: Hyeon-Su Sin, Suwon, Rep. of Korea

[73] Assignee: SamSung Electronics Co., Ltd., Suwon, Rep. of Korea

[21] Appl. No.: 808,721

[22] Filed: Dec. 17, 1991

[30] Foreign Application Priority Data

Jan. 22, 1991 [KR] Rep. of Korea ............... 1991-1023

[51] Int. Cl.[5] ..................... H04N 7/04; H04N 5/14
[52] U.S. Cl. .................................. 358/141; 358/167
[58] Field of Search ............... 358/141, 167, 36, 133, 358/166, 37; 270/81; 360/36.2

[56] References Cited

U.S. PATENT DOCUMENTS

| | | | |
|---|---|---|---|
| 2,881,427 | 11/1957 | Huber | 358/141 |
| 4,262,304 | 5/1981 | Faroudja | 358/37 |
| 4,318,126 | 3/1982 | Sassler | 358/141 |
| 4,459,613 | 7/1984 | Faroudja | 358/167 |
| 4,779,133 | 10/1988 | Sugimori et al. | 358/167 |
| 4,897,832 | 1/1990 | Suzuki et al. | 370/81 |
| 4,905,101 | 2/1990 | Ohta et al. | 360/36.2 |
| 5,016,100 | 6/1991 | Citta et al. | 358/141 |
| 5,128,757 | 7/1992 | Citta et al. | 358/141 |

Primary Examiner—James J. Groody
Assistant Examiner—Glenton B. Burgess
Attorney, Agent, or Firm—Robert E. Bushnell

[57] ABSTRACT

A circuit and a method for transmitting and receiving the image signal by adaptive modulation and for image band compressing by subband coding. The present invention improves the problems that degradation of the picture quality is more serious rather than the noise reduction effect in the edge of the picture even if the channel noise of the low band signal component can be reduced through the noise reducer by using correlation between the picture elements, and that it is waste of the quantity of transmission information that the high band image signal is transmitted in 8-bit pattern because the high band image signal component usually has narrow distribution of its level. According to the present invention, adaptive modulation is applied to the high band image signal and low band image signal respectively and the high band image signal is transmitted in 6-bit pattern, so that the channel noise and the quantity of the transmission information are reduced.

20 Claims, 5 Drawing Sheets

| ADAPTION FACTOR | INDEX | ADDRESS |
|---|---|---|
| 64 | 7 | 0-1-2 |
| 32 | 6 | 3-4 |
| 16 | 5 | 5-8 |
| 8 | 4 | 9-16 |
| 4 | 3 | 17-32 |
| 3 | 2 | 33-42 |
| 2 | 1 | 43-63 |
| 1 | 0 | 64-127 | f1 ←8/   ←8/— (0-127)

3/ ↓ idx1

*FIG. 4A*

| ADAPTION FACTOR | INDEX | ADDRESS |
|---|---|---|
| 31 | 7 | 0-1 |
| 10 | 6 | 2-3 |
| 6 | 5 | 4-5 |
| 4 | 4 | 6-8 |
| 2 | 3 | 9-15 |
| 1 | 2 | 16-31 |
| 1/2 | 1 | 32-64 |
| 1/4 | 0 | 65-127 | f2 ←6/   ←8/— (0-127)

3/ ↓ idx2

*FIG. 4B*

CIRCUIT FOR IMAGE SIGNAL TRANSMISSION AND RECEPTION BY ADAPTIVE MODULATION AND A METHOD THEREFOR

BACKGROUND OF THE INVENTION

The present invention relates to a circuit and a method for transmitting and receiving an image signal in a high definition television, more particularly to a method and a circuit for transmitting and receiving image signals in low and high frequency band by adaptive modulation to reduce transmission channel noises added to the image signals of the low and high frequency bands when an image signal is transmitted after being image band compressed by subband coding.

Adaptive modulation is suggested in order to reduce the channel noises while transmitting the subband coded signal, in MIT method of the advanced television (ATV) method used in the United States high definition television, and is originated in a concept of pseudo noise quantization to remove degradation of contouring artifact due to the quantization noise.

The image signal transmission and reception technique suggested by the MIT method, one of the United States ATV, uses subband coding as the image band compression algorithm, which is the method that the image band is separated into a high frequency band component and a low frequency band component, and noise reduction process in each band is collectively performed at the transmission part.

Since the image signal of the low frequency band in the above described image signal band compression algorithm is a low frequency component signal in space and time, that is, high correlation signal, the noise of the decoder at the reception part is increased in case that a channel noise is induced into the low frequency band image signal. On the other hand, picture quality will be degraded if the channel noise is not reduced in restoring the image signal of the high frequency band component of low amplitude.

The method of the image signal transmission and reception by adaptive modulation for reducing the noise from the transmission channel adaptively, is presented to solve the above described problems.

A block diagram of the image signal transmission and reception shown in FIG. 1 has an encoder 10 of the transmission part and a decoder 20 of the reception part.

The encoder 10 has an adaption conversion part 11, a delay circuit 12, a multiplier 13 and a nonlinear conversion part 14, The encoder 10 produces a low band image signal of a low band image signal input terminal 10a without noise reduction process. The adaption conversion part 11 receives a high band image signal of a high band image signal input terminal 10b, producing an adaption factor fi and an adaption index information idx. The high band image signal of the high band image signal input terminal 10b is delayed by the delay circuit 12. The multiplier 13 multiplies the delayed high band image signal by the adaption factor fi from the adaption conversion part 11. The multiplied high band image signal by the multiplier 13 is nonlinearly transformed by the nonlinear conversion part 22.

The decoder 20 has a noise reducer 21, a nonlinear conversion part 22, an adaption factor generator 23 and a divider 24. The noise reducer 21 low-pass-filters an input of the low band image signal reception input terminal 20a. An input of the high band image signal reception input terminal 20b is clipped below a given level by the nonlinear conversion part 22. The adaption factor generator 23 is connected to the adaption index information reception input terminal 20c and generates the adaption factor fi corresponding to the adaption index information idx. The divider 24 divides the high band image signal of the nonlinear conversion part 22 by the adaption factor fi from the adaption conversion part 23.

FIG. 2 shows the details of the encoder 10. The adaption conversion part 11 has a absolute circuit 11a, a first and a second buffers 11b and 11c, a first inverter 11d, a first latch 11f, a comparator 11h, a second inverter 11e, an OR gate 11i, a second latch 11g and an adaption factor memory 11j. The absolute value circuit 11a receives the high band image signal from the high band image signal input terminal 10b and makes it to be absolute value. The absolute value of the absolute value circuit 11a is buffered by the first and second buffers 11b and 11c. An interval pulse from the clock pulse terminal CP is applied to the second buffer 11c after being inverted by the inverter 11d. The outputs from the first and second buffers 11b and 11c are latched by the first latch 11f. The comparator 11h compares the output from the absolute circuit 11a with the output from the first latch 11f during a given time T1, producing the larger value among them. The output of the comparator 11h is inverted by the second inverter 11e whose output is applied to the first buffer 11b. The OR gate 11i logically add the output of the comparator 11h and the interval pulse, applying its output to the first latch 11f. The second latch 11g latches out the maximum value of the first latch 11f during the given time T1 depending on the interval pulse. The adaption index information idx and the adaption factor fi are outputted from the adaption factor memory 11j according to the level of the maximum value output from the second latch 11g.

The delay circuit 12 has a memory 12a and a delay buffer 12b. The memory 12a receives the high band image signal of the high band image signal input terminal 10b and produces the high band image signal according to a first-in first-out manner depending on a clock pulse generated from the system clock signal input terminal CK. The high band image signal produced from the memory 12a is delayed by the delay buffer 12b while the adaption factor fi is found.

The image signal transmission and reception technique by the conventional adaptive modulation shown in FIG. 1 and FIG. 2 is described in the Korean application patent serial number 8102 filed on 1990 in detail. The method suggested in the "8102", however, divides only the high band image signal except for the low band image signal into special blocks or adaptive area and carries out adaptive modulation to the respective block by using an adaption factor table.

Therefore, the method and the circuit for transmitting and receiving the image signal by adaptive modulation has the following problems.

First, the channel noise of the low band image signal component can be reduced through the noise reducer by using correlation between the picture elements, but degradation of the picture quality in the edge of the picture is more serious problem rather than the noise reduction effect.

Secondly, since the high band image signal component usually has narrow distribution of its level, the image signal transmission in 6-bit pattern is possible, so that it is waste of the quantity of transmission information that the image signal is transmitted in 8-bit pattern.

SUMMARY OF THE INVENTION

Accordingly, it is an object of the present invention to provide a circuit and a method for transmitting and receiving an image signal, by which channel noise can be reduced by applying adaptive modulation to a low band image signal component and a high band image signal component of the image signal respectively.

It is another object of the present invention to provide a circuit and a method for transmitting and receiving an image signal, by which quantity of transmission information can be decreased by transmitting the image signal in 6-bit pattern by using the fact that most of high band image signal component is presented within gray level due to the signal characteristics.

BRIEF DESCRIPTION OF THE DRAWINGS

For a better understanding of the invention and to show how the same may be carried into effect, reference will now be made, by way of example, to the accompanying diagrammatic drawings, in which:

FIG. 4A and 4B is an adaption factor table according to the present invention;

DETAILED DESCRIPTION OF THE PREFERRED EMBODIMENT

Figure 3:
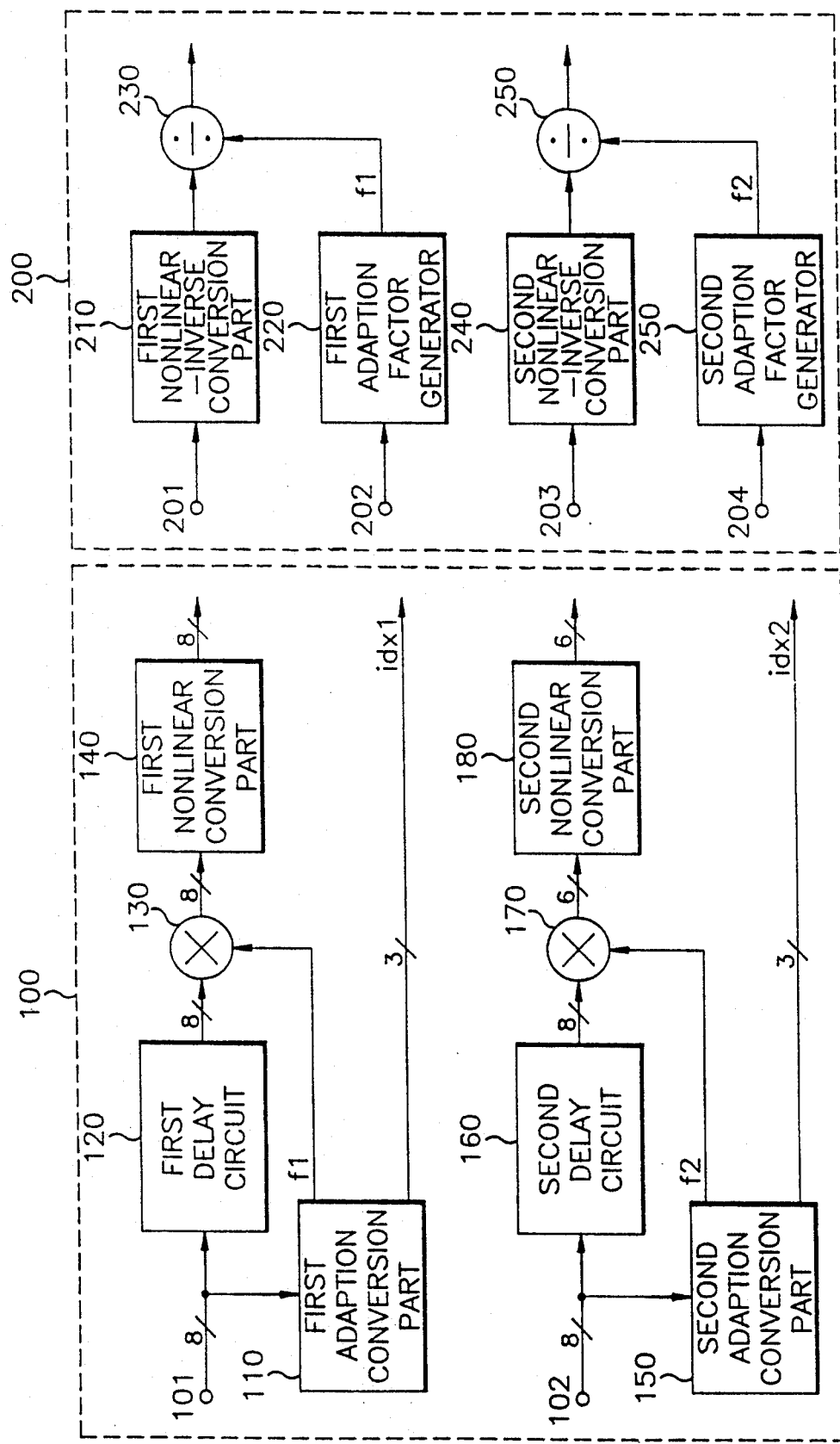
FIG. 3 is a block diagram of a circuit for transmitting and receiving an image signal by adaptive modulation, according to the present invention.

A block diagram of a circuit for transmitting and receiving an image signal by adaptive modulation shown in FIG. 3 has an encoder 100 of the transmitting part and a decoder 200 of the receiving part. The encoder 100 has a first adaption conversion part 110, a first delay circuit 120, a first multiplier 130, a first nonlinear conversion part 140, a second adaption conversion part 150, a second delay circuit 160, a second multiplier 170 and a second nonlinear conversion part 180.

The first adaption conversion part 110 divides a low band image signal applied to a low band image signal input terminal 101 into a given adaptive blocks, finds a maximum value of the low band image signal within the respective divided block, and produces a first adaption factor f1 and a first adaption index information idx I corresponding to the maximum value. The low band image signal of the low band image signal input terminal 101 is delayed by the delay circuit 120 while the first adaption factor f1 is found. The first multiplier 130 multiplies the delayed low band image signal by the first adaption factor f1, and amplifies it. The amplified low band image signal is nonlinearly transformed by the first nonlinear conversion part 140. The second adaption conversion part 150 divides a high band image signal applied to a high band image signal input terminal 102 into given adaptive blocks, finds a maximum value of the high band image signals within the respective block, and produces the second adaption factor f2 and the second index information idx 2 corresponding to the found maximum value. The high band image signal of the high band image signal input terminal 102 is delayed by the second delay circuit 160 while the second adaption factor f2 is found. The delayed high band image signal and the second adaption factor f2 are multiplied together and amplified by the second multiplier 170. The second nonlinear conversion part 180 nonlinearly transforms the amplified high band image signal.

The decoder 200 has a first nonlinear-inverse conversion part 210, a first adaption factor generator 220, a first divider 230, a second nonlinear-inverse conversion part 240, a second adaption factor generator 250 and a second divider 260.

The nonlinear-inverse conversion part 210 clips the adaptive modulated low band image signal below a given level, which is applied to the low band image signal reception terminal 201, and transforms the clipped signal nonlinearly in an inverse mode of the first nonlinear conversion part 140. The first adaption factor generator 220 generates the first adaption factor f1 corresponding to the first index information idx1 applied to the first adaption index information reception input terminal 202. The first divider 230 divides the low band image signal of the first nonlinear-inverse conversion part 210 by the first adaption factor f1, restoring the low band image signal to the original image signal. By a second nonlinear-inverse conversion part 240, the high band image signal below the given level, which is applied to the high band image signal reception input terminal 203, is clipped and is nonlinearly transformed in the inverse mode of the second nonlinear conversion part 240. The second adaption factor generator 250 generates the second adaption factor f2 corresponding to the second index information idx2 applied to the second index information reception input terminal 204. The high band image signal of the second nonlinear-inverse conversion part 240 is divided by the second adaption factor f2 through the second divider 260, thereby restoring the high band image signal to the original image signal.

Figure 1:
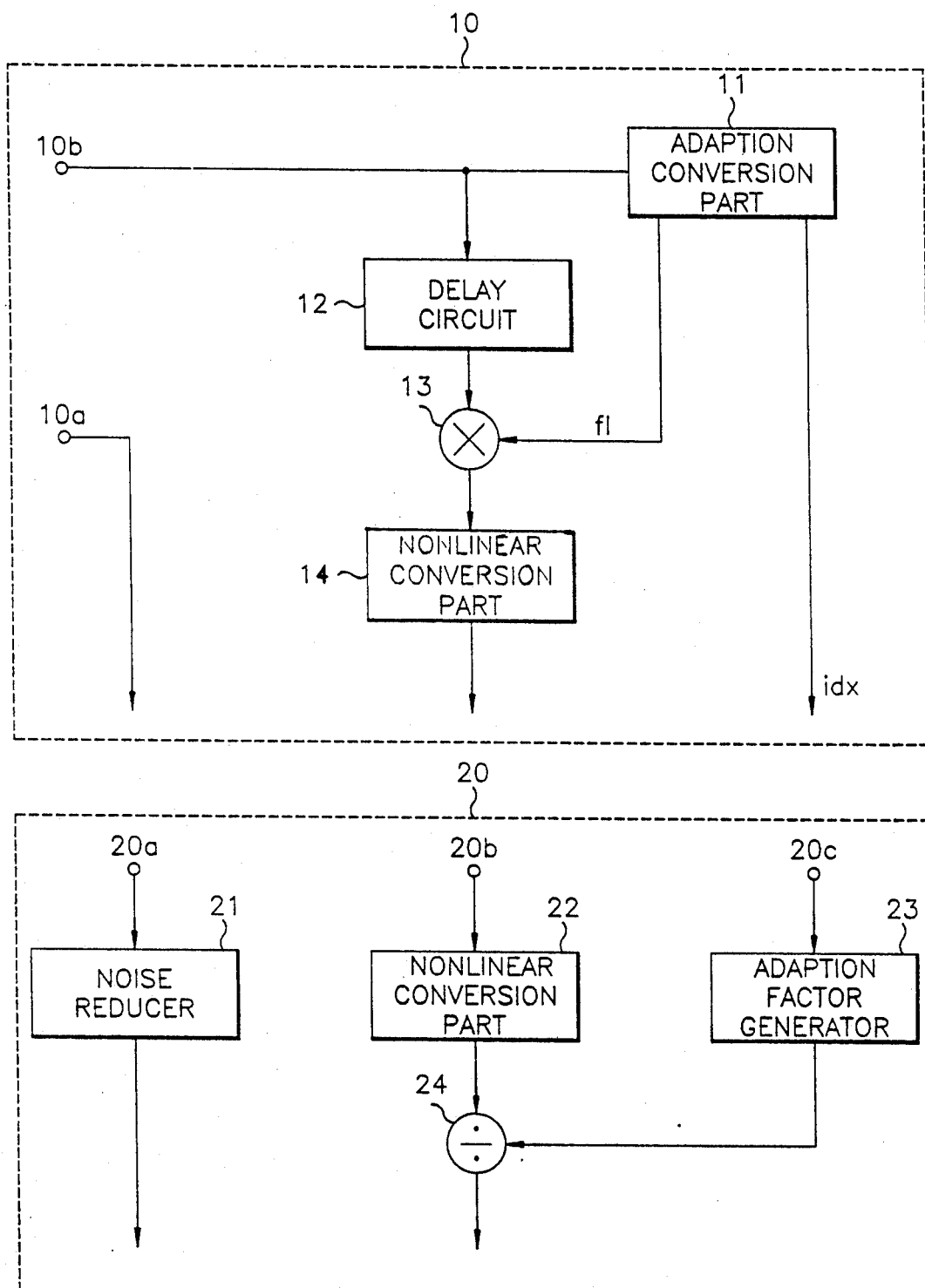
FIG. 1 is a block diagram of a circuit for transmitting and receiving an image signal by adaptive modulation, according to the conventional invention.
Figure 2:
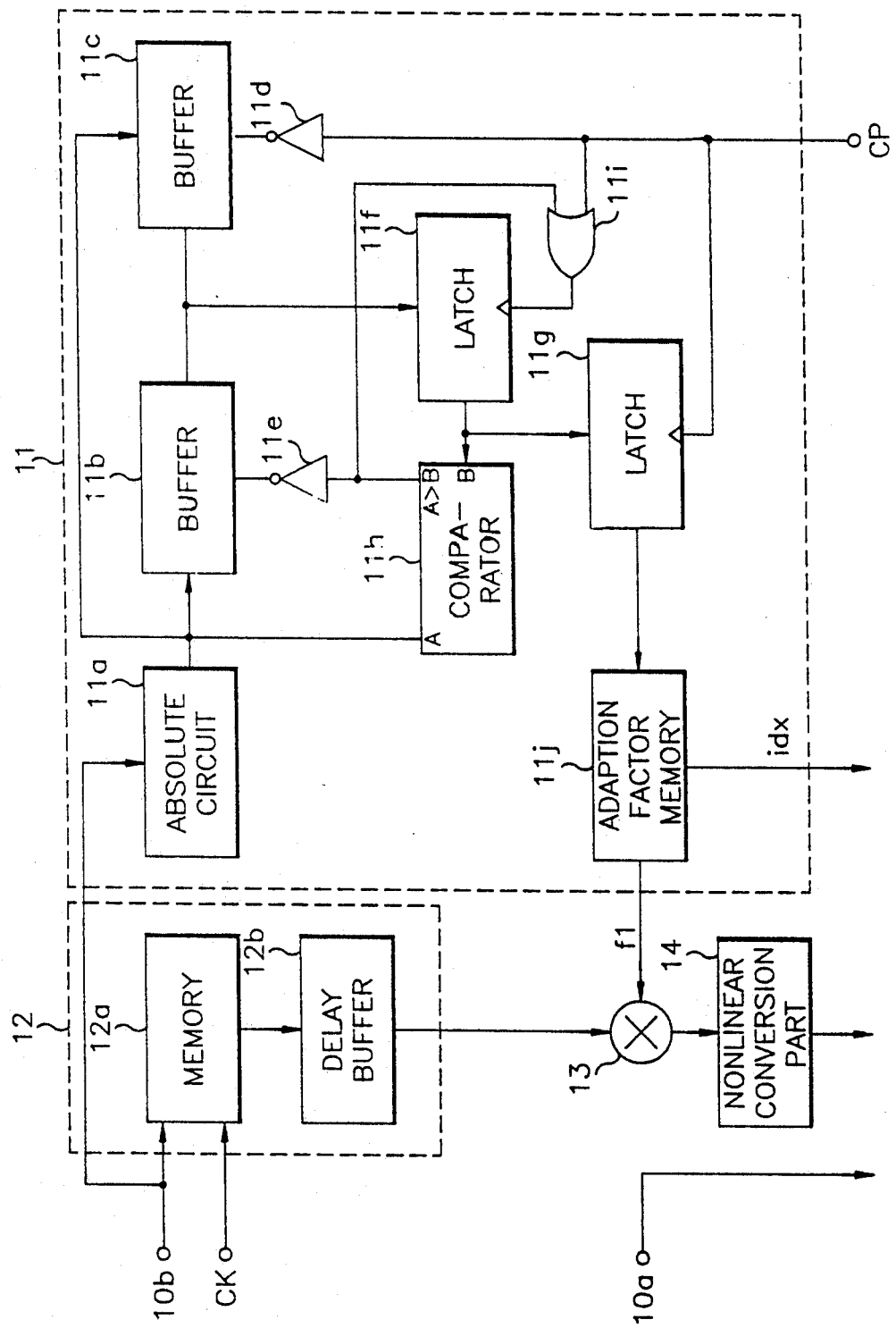
FIG. 2 is detailed block diagram of an encoder shown in FIG. 1.

In FIG. 3, a circuit for transmitting the low band image signal by adaptive modulation is appended to the circuit of FIG. 1, and the high band image signal is transmitted in 6-bit pattern. The details of the first and the second adaption conversion parts 110 and 150 are omitted because they are the same as the details of the adaption conversion parts 11 of FIG. 2.

FIG. 4A is an adaption factor table of the low band image signal, according to the present invention. The address ranges from 0 to 127, and index ranges from 0 to 7 which are correspondent to the first adaption factor f1 values of 1, 2, 3, 4, 8, 16, 32, and 64 respectively. The logic of the adaption factor table shown in FIG. 4A is stored in the adaption factor memory of the first adaption conversion part 110 such as the adaption factor memory 11j of FIG. 2.

FIG. 4B is an adaption factor table of the high band image signal. The address ranges from 0 to 127, and the index ranges from 0 to 7 which are correspondent to the second adaption factor f2 values of $\frac{1}{4}$, $\frac{1}{2}$, 1, 2, 4, 6, 10 and 31. The logic of the adaption factor table shown in FIG. 4B is stored in the adaption factor memory of the second adaption conversion part 150 such as the adaption factor memory 11j of FIG. 2.

Figure 5A:
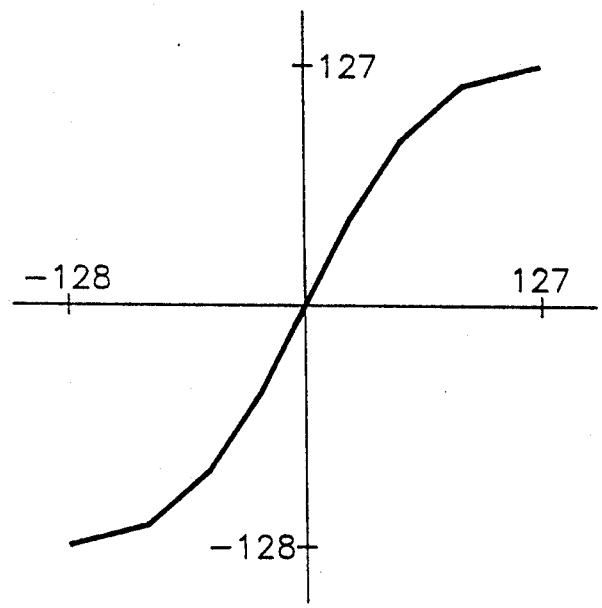
FIG. 5A and 5B is a characteristics diagram of a nonlinear conversion according to the present invention.
Figure 5B:
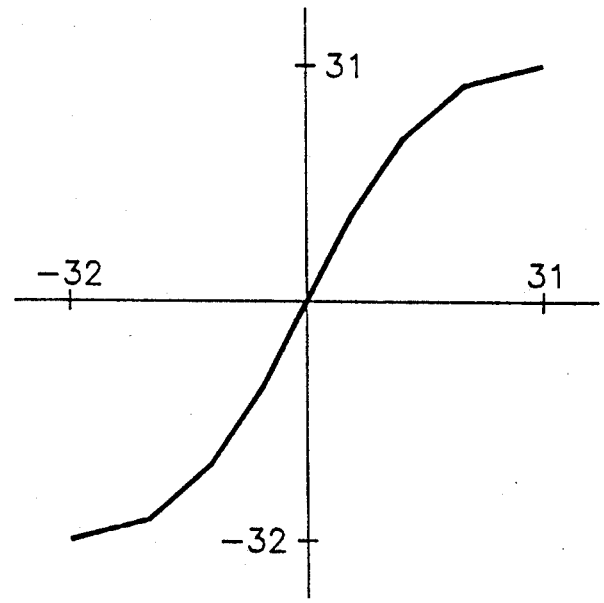

FIG. 5A shows a transformation characteristics of the low band image signal of the first nonlinear conversion part 140 of FIG. 3, and FIG. 5B shows a transformation characteristics of the high band image signal of the second nonlinear conversion part 180 of FIG. 3.

Hereinafter, one embodiment of the present invention now will be described in detail by referring to FIGS. 3 to 5B.

By the subband coding, the image signal band is divided into low band and high band image signals previously. If the low band image signal is provided to the low band image signal input terminal 101, the low band image signal is applied both to the first adaption conversion part 110 and the first delay circuit 120 concurrently. The first adaption conversion part 110 divides the low band image signal into the given adaption blocks (for example, 5×5 picture element blocks), finds a maximum value of the low band image signal within the respective divided block, and calculates the first adaption factor f1 required to adaptive modulation for the low band image signal by comparing the maximum value with a maximum allowable value in its band. Here, the first adaption factor f1 should satisfy the following equation.

$$f_1 = \frac{K}{|h_{max}|} \quad (1)$$

In the above equation (1), $f_1$ is the first adaption factor for adaption modulation of the low band image signal, k is the maximum allowable value of the transmissible low band image signal, and $|h_{max}|$ represents the maximum value of the absolute value of the low band image signals in the adaption block. In this case, k is generally 128 because the low band image signal is quantized with 8 bits.

The adaption factor for the low band image signal can be calculated by the above equation (1), but the present invention finds the adaption factor by using the look-up table or the adaption table suggested in the pre-described conventional method (the patent 8102 filed on 1990). Whereas this conventional method divides the look-up table into 7 levels, the present invention divides the look-up table into 8 levels which is the maximum value obtained from 3 bits as shown in FIG. 4A, which gives greater amplification.

Therefore, the first adaption conversion part 110 finds the maximum value of the signal within the adaption block, and applies the maximum value, as an address, to the adaption factor memory 11j storing the adaption factor table of FIG. 4A, so that the first adaption factor f1 and the first adaption index information idx 1 of 3 bits corresponding to the first adaption factor f1 are outputted. The operation of the first adaption conversion part 110 is omitted because of the detailed pre-description of the conventional method. The first delay circuit 120 delays the low band image signal while the first adaption conversion part 110 finds the first adaption factor f1. Then, the first multiplier 130 multiplies the delayed low band image signal by the first adaption factor f1, and amplifies it. The first nonlinear conversion part 140 nonlinearly transforms the adaptively amplified low band image signal of the first multiplier 130 through the nonlinear function of the characteristics of FIG. 5A, so that the picture element of low level which is not amplified by the first adaption conversion part 110, is amplified.

On the other hand, the high band image signal provided to the high band image signal input terminal 102 is applied to the second adaption conversion part 150 and to the second delay circuit 130 concurrently. The second adaption conversion part 150 produces the second adaption factor f2 required to adaptive modulation for the high band image signal and the second index information idx2 corresponding to the second adaption factor f2. The second adaption conversion part 150 divides the high band image signal into the given adaption blocks, finds a maximum value of the high band image signal within the respective divided block, and calculates the second adaption factor f2 required to adaptive modulation for the high band image signal by comparing the maximum value with a maximum allowable value in its band. In this case, the maximum allowable value k in the block is 32, and the high band image signal is processed in 6-bit pattern because the high band image signal components are generally presented from 0 to 63 (from -32 to 31 in case of 32 offset). Therefore, the adaption factor table of FIG. 4B is used for finding the adaption factor, and the adaption factors are given as ½ or ¼ in case that the maximum value $|h_{max}|$ in the adaption block for the high band image signal component is more than 6 bits, thus reducing the amplitude of the high band image signal. The second adaption conversion part 150 finds the maximum value of the image signal in the adaption block, and inputs this maximum value, as an address, to the adaption factor memory 11j of FIG. 2 storing the adaption factor table of FIG. 4B, so that the second adaption factor f2 of 6 bits and the second adaption index information idx2 of 3 bits corresponding to the second adaption factor f2 are produced. The second delay circuit 160 delays the high band image signal while the second adaption conversion part 150 finds the second adaption factor f2. The second multiplier 170 multiplies the delayed high band image signal by the second adaption factor f2 Then, the second nonlinear conversion part 180 nonlinearly transforms the high band image signal through the nonlinear function of the characteristics of FIG. 5B depending on the 6-bit transmission, so that the picture element of low level which is not amplified by the second adaption conversion part 150 is amplified.

Consequently, the encoder 100 transmits the adaptively modulated low and high band image signals, along with the first and the second adaption index information idx1 and idx2 of the first and the second factors f1 and f2 required to adaptive modulation, respectively.

On the other hand, the reception part or the decoder 200 receives the adaptively modulated low band image signal and the high band image signal and the first and the second index information idx1 and idx2, and restores the low band image signal and the high band image signal to its original state by processing the inverse operation of the transmission part.

Describing the operation of the reception part in detail, the received low band image signal is provided to the low band image signal reception input terminal 201, while the high band image signal is provided to the high band image signal reception input terminal 203. The first and the second adaption index information idx1 and idx2 are applied to the first and the second adaption index information reception input terminals 202 and 204 respectively. Then the first nonlinear-inverse conversion part 210 clips the low band image signal below a given level, which is applied to the low band image signal reception input terminal 201, by coring which makes the converting value below the given level zero. The noise from the signal of low amplitude is relatively more reduced by transforming nonlinearly and inversely through the transformation function having the inverse characteristics such as the nonlinear function of FIG. 5A. The first adaption factor generator 220 receives the first adaption index information idx1 from the first adaption index information reception input terminal 202, generating the first adaption factor f1 corresponding to the first adaption index information idx2. The first adaption factor generated from the first adaption factor generator 220 has the same value with the first adaption factor f1 which was multiplied by the delayed low band image signal in the time of adaptive modulation. The first adaption factor f1 has the relation to the first adaption index information idx1 as shown in FIG. 4A. The first divider 230 divides the low band image signal from the first nonlinear-inverse conversion part 210 by the first adaption factor f1 generated from the first adaption factor generator 220, restoring the low band image signal to its original state.

The second nonlinear-inverse conversion part 240 clips the high band image signal below a given level, which is applied to the high band image signal reception input terminal 203, by coring which makes the converted value below the given level zero. Also the second nonlinear-inverse conversion part 240 reduces more relatively the noise from the signal with low amplitude by transforming nonlinearly and inversely the clipped signal through the transformation function having the inverse characteristics such as the nonlinear function of FIG. 5B. The second adaption factor generator 250 receives the second adaption index information f2, which is applied to the second adaption index information reception input terminal 204, therefrom, to generate the second adaption factor f2 corresponding to the second adaption index information idx2. The second adaption factor f2 generated from the second adaption factor generator 250 has the same value with the second adaption factor f2 which was multiplied by the high band image signal in the time of adaptive modulation. The second adaption factor f2 has the relation to the second adaption index information idx2 as shown in FIG. 4B. The second divider 260 divides the nonlinearly inverted high band image signal at the second nonlinear-inverse conversion part 240 by the second adaption factor f2 generated from the second adaption factor generator 250, restoring the high band image signal to its original state.

At the transmitting part are amplified the original low band and high band signals through the adaption factors thereof, and are transmitted the signals after being nonlinear-transforming. The reception part attenuates the received adaptive modulated low band and high band signals through the same adaption factor to that at the transmitting part, so that the channel noise can be reduced.

As described above, the present invention, in the circuit and the method for transmitting and receiving the image signal by adaptive modulation, has the advantage that degradation of the picture quality can be prevented by the channel noise reduction due to applying adaptive modulation to the high band image signal and to the low band image signal respectively. Moreover, the present invention has another advantage that the quantity of the transmission information can be reduced by transmitting the high band image signal in 6-bit pattern, and that the image signal is amplified more greatly by dividing the operation of adaptive modulation into 8-level which is the maximum value obtained from 3 bits.

While the invention has been particularly shown and described with reference to the preferred specific embodiment thereof, it will be apparent to those who skilled in the art that in the foregoing changes in form and detail may be made without departing from the spirit and scope of the present invention.

What is claimed is:

1. A method for encoding an image signal comprising low band and high band image signals at a transmitter by adaptive modulation and decoding the image signal at a receiver, comprising the steps of:

dividing said low band and high band image signals into a plurality of image adaptive blocks, obtaining maximum values of said low band and high band image signals from the respective image adaptive block;

generating first and second adaptive factors, and adaptive index information corresponding to said maximum values, thereby adaptively transforming said low band and high band image signals;

delaying said low band and high band image signals for a delay period while said first and second adaptive factors are being generated to provide delayed low band and high band image signals;

multiplying the delayed low band and high band image signals by said first and second adaptive factors respectively to provide multiplied signals, and amplifying the multiplied signals to provide amplified low band and high band image signals;

transforming the amplified low band and high band image signals nonlinearly to provide transformed low band and high band image signals;

transmitting the transformed low band and high band image signals with said adaptive index information;

receiving the transmitted low band and high band image signals with said adaptive index information to provide received low band and high band image signals;

clipping the received low band and high band image signals below a given level to provide clipped signals, and reconstructing the clipped signals nonlinearly in an inverse mode of said transforming step to provide reconstructed low band and high band image signals;

generating third and fourth adaptive factors in accordance with said adaptive index information corresponding to said received low band and high band image signals; and dividing the reconstructed low band and high band image signals by said third and fourth adaptive factors, thereby restoring said reconstructed low band and high band image signals to original signals thereof.

2. The method according to claim 1, wherein each of said first, second, third and fourth adaptive factors, and said adaptive index information is determined in accordance with an adaptive factor table corresponding to a maximum value of each of said plurality of image adaptive blocks.

3. The method according to claim 2, wherein said high band of said image signal is transmitted in a 6-bit pattern.

4. The method according to claim 2, wherein said first and second adaptive factors have correspond adaptive index information within a look-up table having 8 levels of amplification.

5. The method according to claim 1, wherein the first adaptive factor is the same as the third adaptive factor, and the second adaptive factor is the same as the fourth adaptive factor.

6. An apparatus for transmitting and receiving an image signal comprising low band and high band image signals by adaptive modulation, said apparatus comprising an encoder at a transmitter and a decoder at a receiver, wherein said encoder comprises:
adaptive transforming means for dividing said low band and high band image signals into a plurality of image adaptive blocks, obtaining maximum values of said low band and high band image signals from the respective image adaptive block, and for generating first and second adaptive factors, and adaptive index information corresponding to said maximum values;
delaying means for delaying said low band and high band image signals for a delay period while said first and second adaptive factors are being obtained to provide delayed low band and high band image signals;
multiplying means for multiplying the delayed low band and high band image signals by said first and second adaptive factors to provide multiplied low band and high band image signals; and
transforming means for transforming said multiplied low band and high band image signals non-linearly, so that said low band and high band image signals are adaptively modulated; and wherein said decoder comprises:
inverse-transforming means for clipping the adaptively modulated low band and high band image signals below a given level, and transforming the clipped low band and high band image signals nonlinearly in an inverse mode of an operation characteristic of said transforming means to provide inverse-transformed low band and high band image signals;
adaptive factor generating means coupled to receive said adaptive index information, for generating third and fourth adaptive factors corresponding to said adaptive index information; and
dividing means for dividing the inverse-transformed low band and high band image signals by said third and fourth adaptive factors, thereby restoring said inverse-transformed low band and high band image signals to original signals thereof.

7. The apparatus according to claim 6, wherein the first adaptive factor is the same as the third adaptive factor, and the second adaptive factor is the same as the fourth adaptive factor.

8. The apparatus according to claim 6, wherein said high band image signal is transmitted in a 6-bit pattern.

9. The apparatus according to claim 6, wherein said first and second adaptive factors have corresponding adaptive index information within a look-up table having 8 levels of amplification.

10. The apparatus according to claim 6, wherein each of said image adaptive blocks is comprised of 5×5 pixels.

11. The apparatus according to claim 6, wherein said adaptive transforming means comprises a look-up table storing a plurality of addresses corresponding to a plurality of adaptive factors for enabling selection of said first and second adaptive factors in dependence upon said maximum values and production of said adaptive index information in dependence upon said maximum values.

12. An encoder and decoder system using adaptive modulation and demodulation, comprising:
means for receiving video signals representative of a plurality of frequency band blocks;
delay means for delaying said video signal for a delayed period to provide delayed video signals;
adaptive modulation means for adaptively modulating said video signals to provide first adaptive factors representative of selected ones of block adaptive factors, and index signals corresponding to said block adaptive factors;
means for transmitting said index signals through a transmission channel;
multiplier means for multiplying said delayed video signals in dependence upon said first adaptive factors to provide adaptive modulated video signals;
first converter means for non-linearly converting and transmitting said adaptive modulated video signals through said transmission channel;
means for receiving the transmitted adaptive modulated video signals and said index signals from said transmission channel;
second converter means for clipping portions of said transmitted adaptive modulated video signals, and for non-linearly converting said transmitted adaptive modulated video signals to provide converted video signals;
adaptive demodulation means coupled to receive the index signals from said transmission channel, for generating second adaptive factors representative of selected ones of said block adaptive factors corresponding to said index signals; and
divider means for dividing said converted video signals in dependence upon said second adaptive factors to provide demodulated video signals representative of original video signals.

13. The encoder and decoder system according to claim 12, wherein said video signals are comprised of high frequency and low frequency components respectively compressed into plurality of frequency band blocks.

14. The encoder and decoder system according to claim 13, wherein each of said frequency band blocks is comprised of 5×5 pixels.

15. The encoder and decoder system according to claim 13, wherein said low frequency components of said video signals are arranged in a 6-bit pattern.

16. The encoder and decoder system according to claim 13, wherein each of said first and second adaptive factors has 8 levels.

17. The encoder and decoder system according to claim 13, wherein said adaptive modulation means comprises a look-up table having a plurality levels of amplification, said look-up table comprising a plurality of addresses corresponding to a plurality of block adaptive factors for enabling selection of said first adaptive factors in dependence upon maximum values of said low frequency and high frequency components of said video signals from the respective frequency band block and enabling production of said index signals in dependence upon said maximum values.

18. The encoder and decoder system according to claim 13, wherein said first adaptive factors comprise adaptive factors for each of the high frequency and low frequency components of said video signals, and said index signals comprises index information for each of the high frequency and low frequency components of said video signals.

19. The encoder and decoder system according to claim 18, wherein said adaptive modulation means providing said first adaptive factors and said index signals representative of said high frequency components of said video signals, comprising:

absolute value means coupled to receive the high frequency components of said video signals compressed into said plurality of said frequency band blocks, for providing an absolute value of each high frequency components in each frequency band block;

first inverter means coupled to a clock pulse terminal, for inverting a clock signal to provide an inverted clock signal;

first buffer means for buffering said absolute value of the high frequency components of said video signals in dependence upon said inverted clock signals to provide a buffered signal;

second buffer means for buffering said absolute value of the high frequency components of said video signal in dependence upon a compared signal;

gate means for logically combining said clock signal and said compared signal to provide a logic signal;

first latch means for latching said buffered signal in dependence upon said logic signal to provide a first latch signal;

comparator means for comparing said absolute value of the high frequency components of said video signals and said first latched signal to provide said compared signal;

second latch means for latching said first latched signal in dependence upon said clock signal to provide a second latched signal; and adaptive factor memory means having a look-up table with a plurality of levels of amplification comprising a plurality of addresses corresponding to a plurality of adaptive factors, for enabling selection of said first adaptive factors and production of said index signals in dependence upon said second latched signal.

20. The apparatus according to claim 6, wherein said adaptive transforming means comprises:

absolute value means coupled to receive the low band image signal and the high band image signal in said plurality of image adaptive blocks, for providing absolute values representative of each of said low band image signal and said high band image signal in each of said plurality of image adaptive blocks;

first inverter means coupled to a clock pulse terminal, for inverting clock signals to provide inverted clock signals;

first buffer means for buffering said absolute values representative of each of said low band image signal and said high band image signal in dependence upon said inverted clock signal to provide buffered signals;

second buffer means for buffering said absolute values in dependence upon compared signals;

gate means for logically combining said clock signals and said compared signals to provide logic signals;

first latch means for latching said buffered signals in dependence upon said logic signals to provide first latched signals;

comparator means for comparing said absolute values and said first latched signals to provide said compared signals;

second latch means for latching said first latched signals in dependence upon said clock signals to provide second latched signals; and adaptive factor memory means comprising a look-up table of 8 levels of amplification for storing a plurality of addresses corresponding to a plurality of adaptive factors, for enabling selection of said first and second adaptive factors and enabling production of said index information in dependence upon said second latched signal.

* * * * *

UNITED STATES PATENT AND TRADEMARK OFFICE
CERTIFICATE OF CORRECTION

PATENT NO. : 5,225,906

DATED : 6 July 1993

INVENTOR(S) : Hyeon-Su Sin, Suwon, Republic of Korea

It is certified that error appears in the above-identified patent and that said Letters Patent is hereby corrected as shown below:

In claim 19, Column 11, Line 28, change "latch" to --latched--.

Signed and Sealed this

Fifth Day of April, 1994

*Attest:*

BRUCE LEHMAN

*Attesting Officer*    *Commissioner of Patents and Trademarks*